United States Patent Office 3,398,179
Patented Aug. 20, 1968

3,398,179
METHOD FOR THE PREPARATION OF
DIPHENYLSILANEDIOL
Donald V. Flatt, Midland, Mich., assignor to Dow Corning Corporation, Midland, Mich., a corporation of Michigan
No Drawing. Filed Aug. 2, 1965, Ser. No. 476,659
14 Claims. (Cl. 260—448.2)

ABSTRACT OF THE DISCLOSURE

A method of preparing diphenylsilanediol by mixing

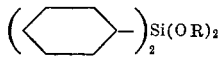

where R is an alkyl radical, water, organic solvent and acid, agitating mildly at a temperature of just above the freezing point of the solution to 40° C. and separating the diphenylsilanediol. The diphenylsilanediol is obtained in high yield and high purity. The diphenylsilanediol is useful in preparing polymers and copolymers and as an additive in silicone elastomers.

---

This invention relates to a method of preparing an improved diphenylsilanediol.

Silicon compounds containing silanol groups have been made. Monomer silicon compounds containing silanol groups have also been made, but none of the prior art methods have been commercially important for producing diphenylsilanediol by an economical method for producing high purity, crystalline diphenylsilanediol in high yield.

An object of the present invention is to provide a method for preparing a high purity crystalline diphenylsilanediol in high yield. Other objects and advantages will become apparent from the following detailed description and the appended claims.

This invention relates to a method of preparing diphenylsilanediol comprising (I) mixing to prepare a solution, (A) a silane of the formula

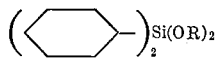

in which R is an alkyl radical having from 1 to 4 inclusive carbon atoms, (B) water in an amount from 1.3 to 4 moles of water per mole of OR, (C) an organic solvent in an amount of 5 to 40 weight percent based on the weight of (A), said organic solvent being a solvent for

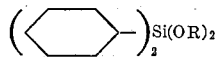

having a dielectric constant of at least 10 and being miscible with water, and (D) an acid in an amount such that the solution has a pH of from 2 to 5 inclusive, (II) agitating mildly at a temperature of from just above the freezing point of the solution to 40° C., and (III) separating diphenylsilanediol from the solution.

The diphenyldialkoxysilane, water, organic solvent and acid can be mixed in any conventional manner. Preferably, the acid is added last and in a dilute form. The resulting solution is agitated mildly at any temperature from just above the freezing point of the solution to 40° C. The preferred temperature is room temperature. The mixture can be agitated for any length of time to permit the reaction to go to completion and to permit the formation of the diphenylsilanediol crystals preferably from 2 to 120 hours. The diphenylsilanediol crystals formed are then separated from the solution in any conventional manner, such as by decanting. The crystal can be washed and dried. Washing is preferred, but not absolutely necessary. The crystals can be washed with water followed by a wash with hexane or some other volatile organic solvent which can readily be removed from the crystals. It is preferable to wash with water to aid in the removal of the acid. The diphenylsilanediol crystals can then be vacuum dried, air dried or drum dried. It is important to keep the drying temperature below the melting point of the crystals.

The diphenyldialkoxysilane, (A),

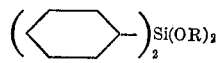

can have alkoxy groups such as where R is methyl, ethyl, n-propyl, isopropyl, n-butyl, isobutyl and tertiary-butyl. Crude diphenyldialkoxysilanes can be used. The impurities such as monophenylsilanetriol can readily be separated from the diphenylsilanediol. In most cases the monophenylsilanetriol is completely removed in the separation.

The amount of water (B) can be from 1.3 to 4 moles of water per mole of OR group of (A). Preferably, the amount of water is from 1.5 to 2.5 moles of water per mole of OR group. When less than 1.3 moles of water are used per mole of OR group, the reaction is incomplete even after long periods of time. When more than 4 moles of water are used per mole OR group, the rate of reaction becomes impractically slow.

Any organic solvent, which is miscible with water, which is a solvent for diphenyldialkoxysilane and which has a dielectric constant of at least 10, can be used. An organic solvent which is miscible with water is a solvent which will not form an organic solvent phase and a water phase when used in the amount required for this invention. Preferably, the organic solvent is also a solvent for diphenyldialkoxysilane. The organic solvent is not necessarily a solvent for the diphenylsilanediol and is preferably not a good solvent for diphenylsilanediol. The organic solvent also has a dielectric constant of at least 10 at 20° C. and a frequency of $10^4$ cycles per second. Preferably, the organic solvent has a dielectric constant of at least 20 at 20° C. and a frequency of $10^4$ cycles per second. Organic solvents with dielectric constants less than 10 are not operative. Suitable organic solvents do not alter the reactants. Examples of these organic solvents are, acetonitrile, acetone, isopropanol, methanol, ethanol, dimethylsulfoxide, N,N-dimethylformamide, formamide, 2-chloroethanol, 2-methoxyethanol and 4-hydroxy-4-methyl-2-pentanone. Solvents such as tetrahydrofuran, ethylacetate, benzene, toluene, hexane, and amyl alcohol are not operative. The organic solvent is present in an amount from 5 to 40 weight percent based on the weight of diphenyldialkoxysilane, preferably from 15 to 25 weight percent. When less than 5 weight percent solvent is present, the diphenylsilanediol is inferior, such as is extremely difficult to filter and work with, the yield is very low and the amount of impurities increase. When more than 40 weight percent organic solvent is used, the yield of diphenylsilanediol is low.

An acid (D), is any acid which will provide the above solution with a pH of from 2 to 5 inclusive. The acids are soluble in the solution and are preferably mineral acids, such as HCl, HBr, $H_3PO_4$ and $HNO_3$. Hydrochloric acid is the most preferred. Other acids such as acetic acid, chloroacetic acid, trifluoroacetic acid, α-chloropropionic acid, formic acid, oxalic acid and citric acid can be used. Preferably, the aid is present in an amount necessary to provide the solution with a pH from 2.5 to 4.0 inclusive.

The diphenylsilanediol prepared by this procedure is a crystalline product. The crystals are large and can readily be worked with. The crystals are monoclinic. The diphenylsilanediol prepared from other methods, such as from diphenyldichlorosilane, is a powdery, amorphous form, is very difficult to filter, to separate from solvents and to work with, and the amount of impurities are often extremely high. When the diphenylsilanediol prepared from the diphenyldichlorosilane is used as a plasticizer in polydimethylsiloxane elastomer, the elastomer is opaque, but when the diphenylsilanediol of the present invention is used, the elastomer is transparent. The present invention also provides diphenylsilanediol which does not contain detrimental impurities as are found in the diphenylsilanediol made by prior art methods. These impurities cause the properties of polymers and rubbers, in which the diphenylsilanediol is used, to be much inferior. Impurities avoided by this method are the metal ions, such as sodium and potassium. The yield of diphenylsilanediol can be as high as 99 percent and the amount of impurities is less than 1.0 percent, usually less than 0.5 percent.

The diphenylsilanediol of this invention can be used as a plasticizer in siloxane elastomer formulations and to make polymers and copolymers.

The following examples are illustrative only and should not be construed as limiting the present invention which is properly delineated in the appended claims.

Example 1

A solution was prepared by mixing 40 g. of diphenyldimethoxysilane which contained about 0.4 g. of monophenyltrimethoxysilane, 11.9 g. of water, 10 g. of isopropanol and 3 drops of 0.1 N HCl. The solution was agitated at room temperature by stirring for 24 hours. The crystals of diphenylsilanediol began to form in 3.5 hours. The diphenylsilanediol crystals were separated from the liquid by filtering, they were washed with water and hexane and then air dried. A yield of 97.1 percent of diphenylsilanediol was obtained. From nuclear magnetic resonance, the ratio of phenyl hydrogens to hydroxyl hydrogens was 10.00 to 2.00.

Example 2

A solution was prepared by mixing 40 g. of crude diphenyldimethoxysilane which is 80.0 weight percent diphenyldimethoxysilane, 10 g. of isopropanol, 10 g. of water and 4 drops of 0.1 N HCl. The solution was agitated at room temperature for 2 hours. The diphenylsilanediol crystals formed were filtered from the solution and washed with water and hexane and then air dried. The crystals of diphenylsilanediol were monoclinic and had a ratio of phenyl hydrogens to hydroxyl hydrogens of 10.00 to 2.11, as determined by nuclear magnetic resonance. The yield of diphenylsilane diol was 100 percent based on the weight of the diphenyldimethoxysilane present in the crude.

Example 3

A solution was prepared by mixing 40 g. of pure diphenyldimethoxysilane, 15 g. of isopropanol, 7.5 g. of water and 4 drops of 0.1 N HCl. The solution was agitated for 17 hours at room temperature. The crystals of diphenylsilanediol were filtered from the solution, washed with water and hexane and then dried. The crystals were satisfactory, but were smaller and solvent was more difficult to remove. The yield of diphenylsilanediol was 85 percent.

Example 4

A solution was prepared by mixing 120 g. of crude diphenyldimethoxysilane which contained 80 weight percent diphenyldimethoxysilane, 30 g. of water, 20 g. of isopropanol and 9 drops of 0.1 N HCl. The mixture was placed in an 8 oz. bottle and agitated for 6 hours at room temperature. The crystals of diphenylsilanediol were filtered from the solution, washed with water and hexane. The ratio of phenyl hydrogens to hydroxyl hydrogens as determined by nuclear magnetic resonance was 10.00 to 2.00. The yield of diphenylsilanediol was 88.4 percent based on the diphenyldimethoxysilane in the crude.

Example 5

A solution was prepared by mixing 40 g. of pure diphenyldimethoxysilane, 10 g. of water, 10 g. of acetonitrile saturated with $CO_2$. The mixture was allowed to agitate for 24 hours at room temperature. No reaction occurred. Then, 2 drops of 0.1 N HCl was added and the mixture was allowed to agitate for 48 hours at room temperature. Well developed monoclinic crystals of diphenylsilanediol formed. The nuclear magnetic resonance ratio of phenyl hydrogens to hydroxyl hydrogens was 10.00 to 2.11. The yield of diphenylsilanediol was 71.8 percent.

Example 6

A solution was prepared by mixing 40 g. of pure diphenyldimethoxysilane, 10 g. of water, 5 g. of acetone and 6 drops of 0.1 N HCl. The mixture was agitated for 24 hours at room temperature. The crystals of diphenylsilanediol were filtered from the solution, washed with water and hexane and then vacuum dried. The yield of diphenylsilanediol was 92.6 percent. The nuclear magnetic resonance ratio of phenyl hydrogens to hydroxyl hydrogens was 10.00 to 2.14.

Example 7

When a solution of 32.8 g. of diphenyldibutoxysilane, 21.6 g. of water, 21.9 g. of 2-methoxyethanol and 8 drops of 0.2 N trifluoroacetic acid is mixed and agitated at 10° C. for 10 hours. Crystals of diphenylsilanediol are obtained as in Example 1.

Example 8

When a solution of 27.2 g. of diphenyldiethoxysilane, 16.2 g. of water, 1.4 g. of ethanol and 4 drops of 0.2 N nitric acid is prepared and agitated for 60 hours at room temperature, diphenylsilanediol is obtained as in Example 1.

Example 9

The following solutions were prepared by mixing 220 g. of diphenyldimethoxysilane, 64.8 g. of water, 33.0 g. of isopropanol and 0.1 N HCl in an amount to provide the pH as shown below in the table. The mixtures were agitated mildly for the time shown and at room temperature. The crystals of diphenylsilanediol were separated from the solutions and washed with water followed by hexane and then dried. The diphenylsilanediol was obtained in yields as shown below and the nuclear magnetic resonance hydrogen ratios are shown.

| Run. No. | pH of solution | Length of agitation, hrs. | Percent Yield | Melting Point, ° C. | NMR, Phenyl-H:Hydroxyl-H |
|---|---|---|---|---|---|
| 1 | 5.0 | 120 | 93.6 | 176 | 10.00:2.00 |
| 2 | 4.2 | 110 | 92.9 | 174 | 10.00:2.01 |
| 3 | 3.6 | 120 | 93.9 | 175 | 10.00:2.04 |
| 4 | 3.0 | 24 | 92.8 | 174 | 10.00:1.87 |
| 5 | 2.5 | 24 | 93.7 | 173 | 10.00:1.95 |
| 6 | 2.0 | 24 | 92.9 | 174 | 10.00:2.14 |

Example 10

When a solution of 30.0 g. of diphenyldiisopropoxysilane, 16.2 g. of water, 5 g. of 4-hydroxy-4-methyl-2-pentane and 6 drops of 0.3 N oxalic acid is prepared and agitated for 24 hours at 40° C., diphenylsilanediol is obtained as in Example 1.

That which is claimed is:

1. A method of preparing diphenylsilanediol comprising (I) mixing to prepare a solution,
(A) a silane of the formula

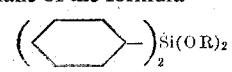

in which R is an alkyl radical having from 1 to 4 inclusive carbon atoms,
(B) water in an amount from 1.3 to 4 mols of water per mole of OR,
(C) an organic solvent in an amount of 5 to 40 weight percent based on the weight of (A), said organic solvent being a solvent for

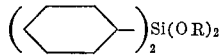

having a dielectric constant of at least 10 and being miscible with water, and
(D) an acid in an amount such that the solution has a pH of from 2 to 5 inclusive,
(II) agitating mildly at a temperature of from just above the freezing point of the solution to 40° C., and
(III) separating diphenylsilanediol from the solution.

2. The method in accordance with claim 1 in which the water (B) is present in an amount from 1.5 to 2.5 moles of water per mole of OR, the organic solvent has a dielectric constant of at least 20 and the acid is a strong mineral acid.

3. The method in accordance with claim 2 in which the organic solvent is present from 15 to 25 weight percent based on the weight of

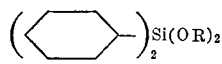

4. The method in accordance with claim 2 in which the acid is in an amount such that the solution has a pH of from 2.5 to 4.0.

5. The method in accordance with claim 1 in which the solution is agitated at room temperature and the diphenylsilanediol is separated from the solution and thereafter dried.

6. The method in accordance with claim 1 in which the organic solvent is at least one organic compound selected from the group consisting of acetonitrile, acetone, isopropanol, dimethylsulfoxide, N,N-dimethylformamide, methanol and ethanol.

7. The method in accordance with claim 6 in which the solvent is isopropanol.

8. The method in accordance with claim 1 in which R is a methyl radical.

9. The method in accordance with claim 2 in which R is a methyl radical.

10. The method in accordance with claim 4 in which R is a methyl radical.

11. The method in accordance with claim 5 in which R is a methyl radical.

12. The method in accordance with claim 7 in which R is a methyl radical.

13. The method in accordance with claim 10 in which the organic solvent is isopropanol.

14. The method in accordance with claim 13 in which the acid is hydrochloric acid.

References Cited

UNITED STATES PATENTS

| | | | |
|---|---|---|---|
| 2,899,453 | 8/1959 | Spector et al. | 260—448.2 |
| 3,304,318 | 2/1967 | Brady | 260—448.2 |
| 3,309,390 | 3/1967 | Omietanski | 260—448.2 |
| 3,228,903 | 1/1966 | Dennis | 260—448.2 XR |

OTHER REFERENCES

Eaborn: "Organosilicon Compounds," Academic Press Inc. (N.Y.), 1960, pp. 249, 301, and 302.

HELEN M. McCARTHY, *Primary Examiner.*

P. F. SHAVER, *Assistant Examiner.*